(12) United States Patent
Zhou et al.

(10) Patent No.: US 12,044,302 B2
(45) Date of Patent: Jul. 23, 2024

(54) TRANSMISSION SYSTEM FOR AIRCRAFT POWERPLANT

(71) Applicant: CHONGQING ZONGSHEN AERO ENGINE MFG CO., LTD., Chongqing (CN)

(72) Inventors: Dan Zhou, Chongqing (CN); Yinchao Xiong, Chongqing (CN); Liping Pi, Chongqing (CN); Zhong Tang, Chongqing (CN)

(73) Assignee: CHONGQING ZONGSHEN AERO ENGINE MFG CO., LTD., Chongqing (CN)

( * ) Notice: Subject to any disclaimer, the term of this patent is extended or adjusted under 35 U.S.C. 154(b) by 0 days.

(21) Appl. No.: 18/036,715

(22) PCT Filed: Nov. 11, 2021

(86) PCT No.: PCT/CN2021/130020
§ 371 (c)(1),
(2) Date: May 12, 2023

(87) PCT Pub. No.: WO2022/100657
PCT Pub. Date: May 19, 2022

(65) Prior Publication Data
US 2023/0392679 A1   Dec. 7, 2023

(30) Foreign Application Priority Data

Nov. 13, 2020 (CN) .......................... 202011267099.3

(51) Int. Cl.
*F16H 57/021* (2012.01)
*F16D 7/04* (2006.01)
*B64D 35/00* (2006.01)

(52) U.S. Cl.
CPC ........... *F16H 57/021* (2013.01); *F16D 7/044* (2013.01); *B64D 35/00* (2013.01)

(58) Field of Classification Search
CPC ........ F16H 57/021; F16D 7/044; B64D 35/00
(Continued)

(56) References Cited

U.S. PATENT DOCUMENTS

| 4,325,470 A | 4/1982 | Bopp | |
|---|---|---|---|
| 11,486,451 B2 * | 11/2022 | Reubens | ................. F16D 7/027 |
| 2020/0307971 A1 | 10/2020 | Maghsoodi | |

FOREIGN PATENT DOCUMENTS

| CN | 2639612 Y | 9/2004 |
|---|---|---|
| CN | 204692539 U | 10/2015 |

(Continued)

*Primary Examiner* — Greg Binda
(74) *Attorney, Agent, or Firm* — Bayramoglu Law Offices LLC

(57) ABSTRACT

A transmission system for an aircraft powerplant includes a transmission shaft, where an input end of the transmission shaft is sleeved with a driven gear. One end of the driven gear is axially limited, and the other end of the transmission shaft is configured to connect a rotating member. Furthermore, the other end of the driven gear is in transmission connection with a stop hub, and the stop hub is in transmission connection with an overload clutch. The overload clutch is in transmission connection with the transmission shaft. A disc spring member is interposed between one end of the overload clutch and the stop hub, and the other end of the overload clutch is axially limited. A limit distance is formed between the overload clutch and the stop hub, and a force value of the overload clutch varies with a pressure applied.

17 Claims, 6 Drawing Sheets

(58) Field of Classification Search
USPC .................................... 464/38, 39, 46–48
See application file for complete search history.

(56) References Cited

FOREIGN PATENT DOCUMENTS

| | | |
|---|---|---|
| CN | 204716906 U | 10/2015 |
| CN | 105782267 A | 7/2016 |
| CN | 105909692 A | 8/2016 |
| CN | 110285207 A | 9/2019 |
| CN | 209668659 U | 11/2019 |
| CN | 209856258 U | 12/2019 |
| CN | 112377600 A | 2/2021 |
| CN | 112377601 A | 2/2021 |
| EP | 0612929 A2 | 8/1994 |
| FR | 2740519 A1 | 4/1997 |
| GB | 711213 A | 6/1954 |
| GB | 879063 A | 10/1961 |
| JP | H03172657 A | 7/1991 |
| JP | 2018100700 A | 6/2018 |

\* cited by examiner

TRANSMISSION SYSTEM FOR AIRCRAFT POWERPLANT

CROSS REFERENCE TO THE RELATED APPLICATIONS

This application is the national phase entry of International Application No. PCT/CN2021/130020, filed on Nov. 11, 2021, which is based upon and claims priority to Chinese Patent Application No. 202011267099.3, filed on Nov. 13, 2020, the entire contents of which are incorporated herein by reference.

TECHNICAL FIELD

The present disclosure relates to a power transmission system, and in particular, to a transmission system for an aircraft powerplant.

BACKGROUND

An aircraft powerplant includes power systems for helicopters, unmanned aerial vehicles, or various aircraft. In an engine transmission mechanism, power is transmitted from a main transmission shaft (crankshaft) to a driving gear, then the driving gear drives a driven gear to rotate, and finally the rotation of the driven gear is transmitted to a rotating member (a propeller shaft, a driving flange, etc.) by a transmission shaft. On existing driven teeth, a clutch is often mounted on the rotating member, and the clutch is connected to the rotating member by a spline. When the rotating member is subjected to an external force that exceeds what the member can bear during power transmission, the clutch and the rotating member are temporarily separated from a rotating direction, that is, the clutch and a rotating shaft slip, so as to prevent rotating components (including the rotating shaft, a driving shaft, etc.) from being damaged by impact. In order to prevent the rotating shaft from being damaged, the clutch slip torsional moment needs to be designed reasonably. In this way, however, the torque that can be transmitted by such a transmission system is limited, and the scope of application cannot be effectively expanded, resulting in poor economy.

Chinese patent CN204692539U discloses a buffer structure for an engine transmission system. The buffer structure includes a transmission shaft and driven teeth and further includes an elastic member and a stop hub. The transmission shaft is sequentially sleeved with the elastic member, the stop hub, and the driven teeth; a driven gear is in clearance fit with the transmission shaft, the stop hub is circumferentially fixed to the transmission shaft, the elastic member is in clearance fit with the transmission shaft, and the stop hub is in curved surface contact with the driven teeth.

In the above patent, the transmission torque is limited, and a protruding claw is subjected to a large impact load, which makes the contact force on the protruding claw too large and causes wear, and also makes the tensile force of the shaft too large and can easily result in damage.

SUMMARY

An objective of the present disclosure is to provide a transmission system for an aircraft powerplant, which has a wide range of applications and can be matched with more power systems.

To achieve the above objective, the present disclosure is arranged as follows: A transmission system for an aircraft powerplant includes a transmission shaft. An input end of the transmission shaft is sleeved with a driven gear, with one end of the driven gear being axially limited. The other end of the transmission shaft is configured to connect a rotating member. The other end of the driven gear is in transmission connection with a stop hub, and the stop hub is in transmission connection with an overload clutch. The overload clutch is in transmission connection with the transmission shaft. A disc spring member is interposed between an end of the overload clutch and the stop hub. The other end of the overload clutch is axially limited, and a limit distance is formed between the overload clutch and the stop hub. A force value of the overload clutch varies with a pressure applied. An end face of the driven gear facing the stop hub is provided with a protruding claw A, and an end of the stop hub is provided with a protruding claw B matching the protruding claw A. The stop hub and the driven gear are in transmission through the matching between the protruding claws. In the power transmission system of the above solution, the overload clutch adjusts the force value by the pressure of the stop hub. When the resistance applied on the transmission shaft is too large, the axial movement distance of the stop hub becomes larger, and the pressure applied on the overload clutch increases, which causes a slip force value to become larger. In this way, the transmission system of the above solution can be matched with engines of different powers, and has a wide range of applications.

To further reduce contact stress of the protruding claw and improve reliability, the protruding claw A and the protruding claw B are provided with a same number of claw teeth, the claw teeth of the protruding claw A and the claw teeth of the protruding claw B match each other, and the protruding claw A and the protruding claw B each have 3-10 claw teeth.

To further improve contact reliability, the claw teeth of the protruding claw A and the claw teeth of the protruding claw B each have inclined planes and a top surface, a bottom surface is provided between adjacent protruding claws, the inclined plane is a spiral section, a fillet is provided between the inclined plane and the top surface, and a fillet is provided between the inclined plane and the bottom surface.

Preferably, the spiral section has a helix angle of 25°-65°.

To further improve the contact reliability, each claw tooth of the protruding claw A has a height greater than that of the claw tooth of the protruding claw B. A height difference between the claw teeth of the protruding claw A and the claw teeth of the protruding claw B is 0.1-3 mm.

To further ensure the contact reliability, a corresponding central angle between adjacent claw teeth of the protruding claw A is greater than a central angle corresponding to the claw tooth of the protruding claw B, and a corresponding central angle between adjacent claw teeth of the protruding claw B is greater than a central angle corresponding to the claw tooth of the protruding claw A.

To further achieve a better fitting effect, the top surface and the inclined planes of each claw tooth of the protruding claw A and/or the protruding claw B and the bottom surface between adjacent claw teeth each have a drum-shaped size of 0.02-0.1 mm.

To further prevent axial displacement of the driven gear, a shaft sleeve is arranged on the transmission shaft at an end of the driven gear, the shaft sleeve axially limits the driven gear, and a needle bearing is arranged between an end face of the driven gear and an end face of the shaft sleeve.

To further reduce a size and shorten a axial length, an end of the stop hub is provided with a flange, the protruding claw B is arranged on an end face of the flange, a spline is arranged on an outer peripheral wall of the stop hub, an inner ring of the overload clutch is sleeved on and is in spline fit with the outer peripheral wall of the stop hub, an inner ring of a front end housing of the overload clutch is splined with the transmission shaft, and a front end face of the front end housing is axially limited, a disc spring is arranged between a rear end housing of the overload clutch and the end face of the flange of the stop hub, an outer ring 63 of the overload clutch covers the disc spring.

To further protect a rotating shaft from damage, a shaft shoulder is arranged on the transmission shaft, an isolating ring is arranged at the shaft shoulder, and the isolating ring axially limits the front end face of the front end housing of the overload clutch; and the isolating ring is in cambered surface contact with the shaft shoulder. In the case of use of the isolating ring, the isolating ring tends to become larger due to an oblique force when subjected to a maximum axial force that exceeds what the system can bear. When the maximum axial force exceeds the force that the isolating ring can bear, the isolating ring is damaged to protect the rotating shaft from damage.

To further reduce the axial length, a bearing for supporting a case is arranged between the isolating ring and the front end face of the front end housing of the overload clutch.

Advantages

Firstly, in the transmission system for the aircraft powerplant of the present invention, when the driven gear rotates, the torque input from the driving teeth is transmitted. Since the protruding claw of the driven gear is in bevel contact with the stop hub, and when a torque component exceeds the friction force of the protruding claw at an original position, the stop hub is moved backward by the axial force, and the disc spring is pressed after an axial movement, resulting in a reaction force opposite to a moving direction to maintain the position of the stop hub. The other side of the disc spring is subjected to the same force, which acts on the friction plates of the clutch, and the friction coefficient of the friction plates is fixed. When the pressure increases, the friction force increases, that is, a slip torque increases. Therefore, the power system of the present invention can be matched with engines of different powers and a variety of powertrain, achieve the purpose of overload protection in different powertrain states, and has good economy.

Secondly, the protruding claw mechanism cooperates with the disc spring to achieve the objective of vibration reduction, and the vibration reduction is achieved by the rotation speed unevenness and torque unevenness caused by the transmission of the driving gear through the cooperation of the protruding claw and a reaction force of the disc spring. When the torque increases, the protruding claw mechanism moves backward to compress a disc spring group, and the disc spring group stores potential energy, and releases the potential energy when the torque decreases, so as to adjust the torque fluctuation. When the rotation speed fluctuates, the same effect and principle are achieved.

Thirdly, the driven gear transmits rotation torque to the stop hub by the protruding claw mechanism, and the stop hub is connected to an internal spline of the overload clutch by a spline. A slip force value of the internal spline is adjusted (a friction coefficient is fixed) by the magnitude of a pressing force of the disc spring, and the overload clutch is connected to an output shaft by the spline. When resistance of the output shaft is greater than slip torque of the overload clutch, the clutch slides to disconnect the stop hub of the output shaft to temporarily interrupt the power, so as to achieving the purpose of protecting a transmission shaft and other weak parts. The safety performance is improved.

Fourthly, the transmission system of the present invention has a light weight, small size, and facilitate arrangement, so that it has great advantages for mechanical arrangements sensitive to size and weight.

Fifthly, through the design of the isolating ring, not only can the disc spring seat be limited, but also a functionality of impact protection can be achieved.

DESCRIPTION OF REFERENCE NUMERALS

Figure 1:
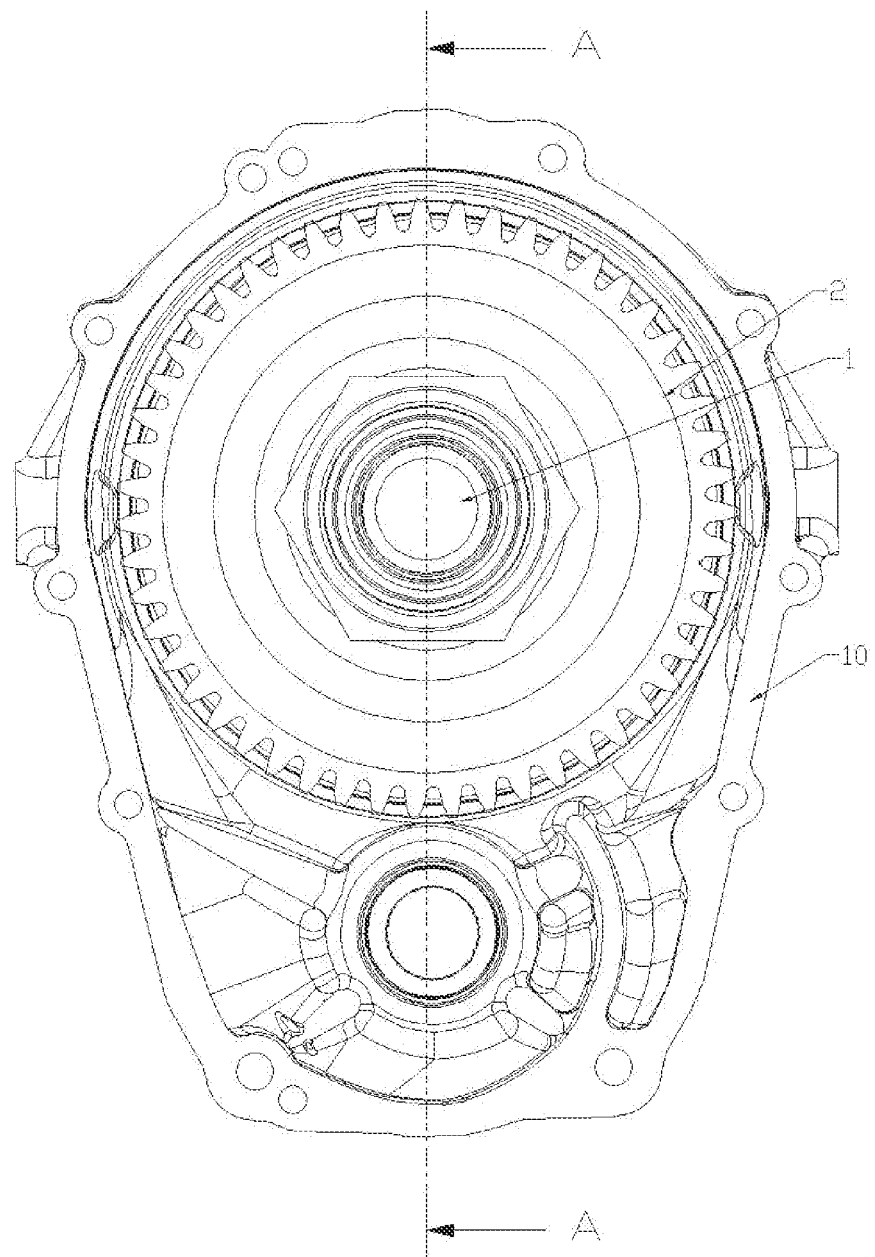
FIG. 1 is a front view of a transmission system for an aircraft powerplant in an embodiment.
Figure 2:
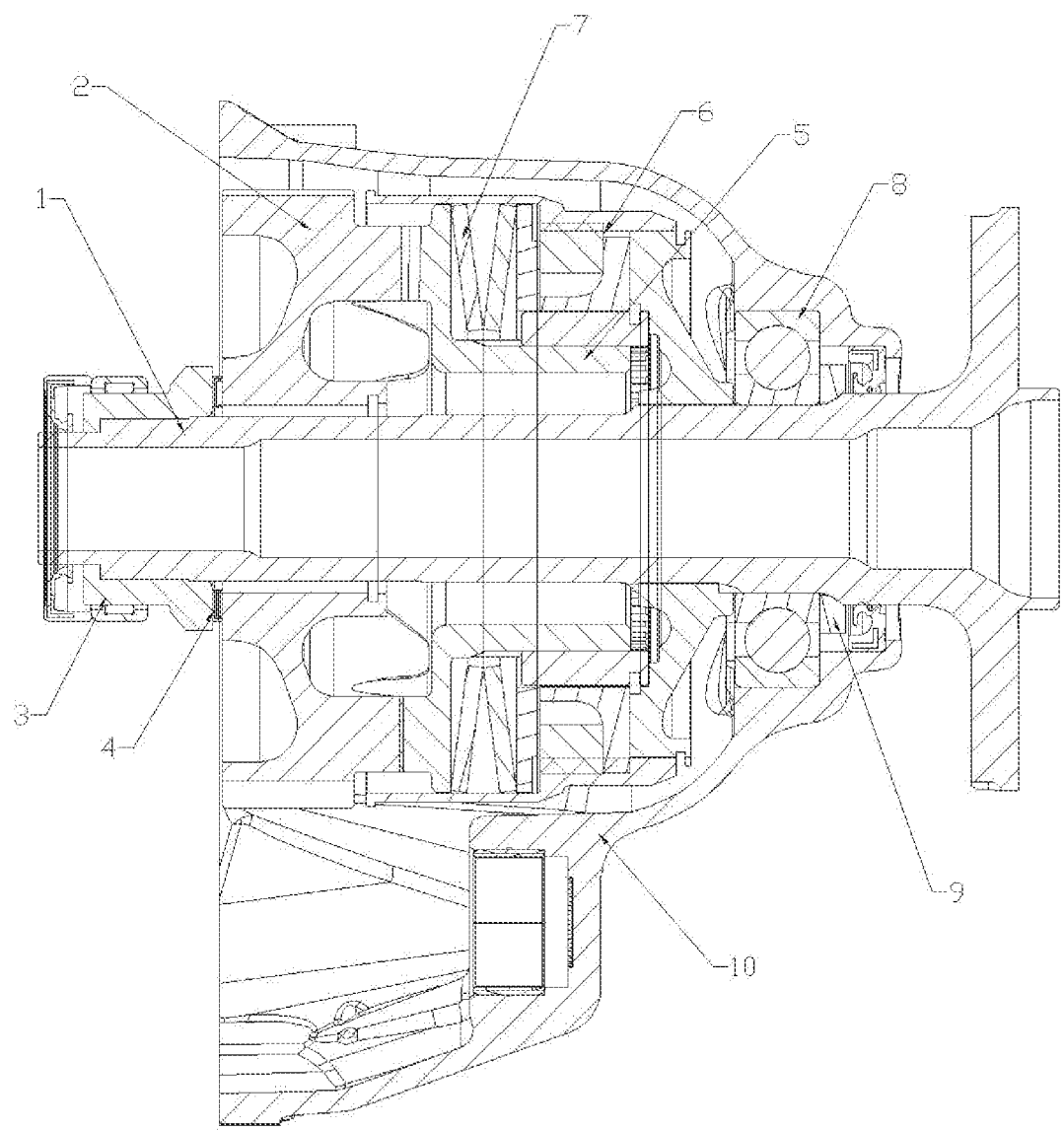
FIG. 2 is a sectional view taken along line A-A of FIG. 1.
Figure 3:
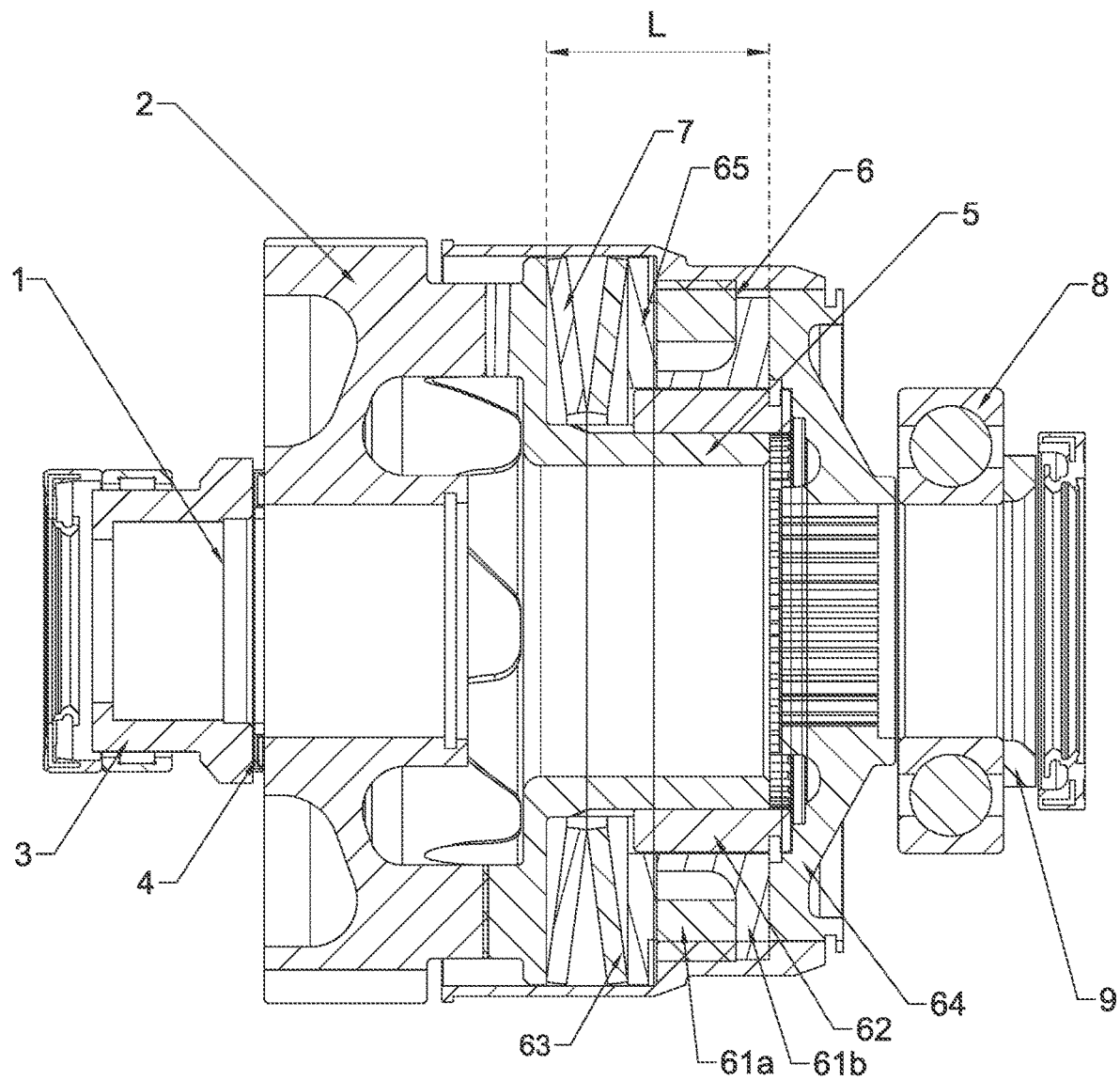
FIG. 3 is a cross-sectional view taken along line A-A of FIG. 1 (including no case)
Figure 4:
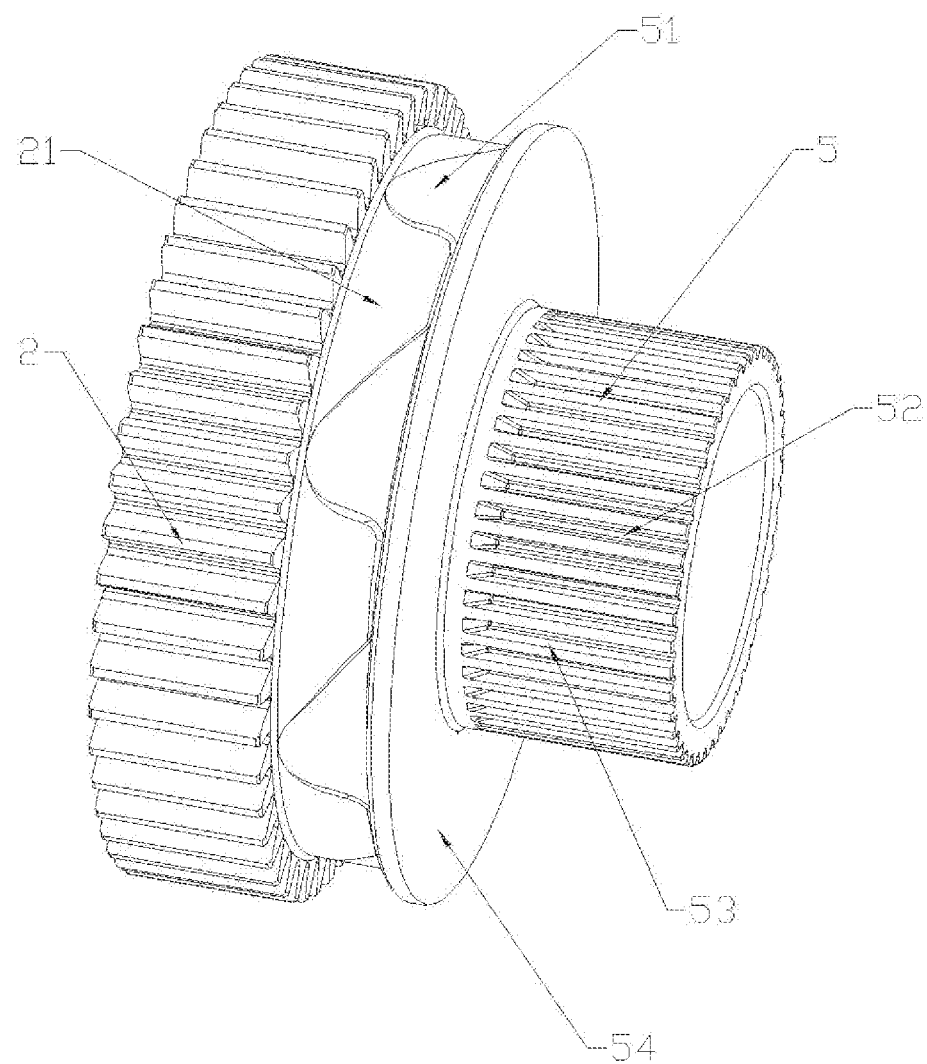
FIG. 4 is a structural diagram showing the cooperation between a stop hub and a driven gear.

1 Transmission shaft; 2 Driven gear, 21 Protruding claw A, 3 Shaft sleeve, 4 Needle bearing, 5 Stop hub, 51 Protruding claw B, 52 Clutch shaft sleeve, 53 Spline, 6 Overload clutch, 61a and 61b Friction plates, 62 Inner ring, 63 Outer ring, 64 Front end housing, 7 Disc spring member, 8 Ball bearing, 9 Isolating ring, 10 Transmission case, 22/54 Inclined plane, 23/55 Top surface, 24/56 Bottom surface, and 25/57 Fillet.

DETAILED DESCRIPTION OF THE EMBODIMENTS

Specific implementations of the present disclosure will be further described in detail below with reference to the accompanying drawings, but the present disclosure is not limited to these implementations, and any improvement or substitution based on the basic spirit of the embodiments still falls within the scope of the claims of the present disclosure.

Embodiment: As shown in FIG. 1 to FIG. 6, this embodiment provides a transmission system for an aircraft powerplant, e.g., an aircraft such as an unmanned aerial vehicle and a helicopter. The transmission system includes transmission shaft 1. An input end of the transmission shaft is sleeved with a driven gear 2, one end of the driven gear is axially limited, and the other end of the transmission shaft is configured to connect a rotating member. The rotating member is generally a propeller.

In this embodiment, an end of the driven gear that faces away from the propeller is limited by shaft sleeve 3, and needle bearing 4 is arranged between an end face of the shaft sleeve and an end face of the driven gear. The driven gear is in meshing transmission with a driving gear in a transmission case, the driving gear is connected to a power output shaft of an aero engine, and the engine transmits power to the driving gear and then to the driven gear.

The other end of the driven gear is in transmission connection with stop hub 5, the stop hub is in transmission connection with an overload clutch 6, the overload clutch is in transmission connection with the transmission shaft 1, a disc spring member 7 is interposed between an end of the overload clutch and the stop hub, and the other end of the overload clutch is axially limited. A limit distance is formed between the overload clutch and the stop hub. A force value of the overload clutch varies with a pressure applied. Specifically, in this embodiment, the pressure applied on the overload clutch comes from the disc spring member, the disc spring member will produce pressure on the overload clutch when the disc spring member is compressed by the stop hub, and when the pressure increases, the force value required for the overload clutch to slip increases.

In this embodiment, an end face of the driven gear facing the stop hub is provided with protruding claw A 21, an end of the stop hub is provided with protruding claw B 51 matching the protruding claw A, and the stop hub and the driven gear are in transmission through the matching between the protruding claws. The protruding claw A and the protruding claw B are provided with a same number of claw teeth, the claw teeth of the protruding claw A 21 and the claw teeth of the protruding claw B 51 match each other, and the protruding claw A and the protruding claw B each have 3-10 claw teeth. The number of the claw teeth may be selected but is not limited to 3, 4, 5, 6, 7, 8, 9 or 10.

In addition, the claw teeth of the protruding claw A and the claw teeth of the protruding claw B each have inclined plane 22/54 and top surface 23/55, bottom surface 24/56 is provided between adjacent claw teeth, the inclined plane is a spiral section, fillet 25/57 is provided between the inclined plane and the top surface, and fillet 25/57 is provided between the inclined plane and the bottom surface. The bottom surface may be a flat surface, or the bottom surface may be a hollows formed by two adjacent spiral sections. The top surface may be a flat surface, or the top surface may be a hollows formed by two adjacent spiral sections.

Preferably, the spiral section has a helix angle of 25°-65°. Helix angles of inclined planes on two sides of each of the claw teeth may be the same or different, and may be selected but are not limited to 25°, 30°, 35°, 40°, 45°, 50°, 55°, 60° or 65°. Each inclined plane of the claw teeth of the protruding claw A and a matching inclined plane of the claw tooth of the claw B have the same helix angle. Each claw tooth of the protruding claw A has a height different from that of the claw tooth of the protruding claw B.

In this embodiment, the protruding claw A and the protruding claw B each have seven claw teeth. Helix angles of two inclined planes of each claw tooth of the protruding claw A are not the same, the top surface of the claw tooth of the protruding claw A is a flat surface, a bottom surface between adjacent claw teeth is a rounded-corner surface formed by inclined planes of the adjacent claw teeth. Helix angles of two inclined planes of each claw tooth of the protruding claw B are not the same, and each inclined plane of the claw tooth of the protruding claw B has a helix angle the same with that of a matching claw tooth of the protruding claw A. The top surface of each claw tooth of the protruding claw B is a rounded-corner surface formed by two inclined planes at two side, a bottom surface between two adjacent claw teeth of the protruding claw B is a flat surface. In addition, a height difference between the claw teeth of the protruding claw B and the claw teeth of the protruding claw A is 0.1-3 mm, and may be selected, but is not limited to 0.1 mm, 0.2 mm, 0.5 mm, 1 mm, 1.5 mm, 2 mm, 2.5 mm, and 3 mm. In this embodiment, each claw tooth of the protruding claw B has a height 0.5 mm greater than that of the claw tooth of the protruding claw A.

In addition, a corresponding central angle $\alpha 1$ between adjacent claw teeth of the protruding claw A is greater than a central angle $\beta 2$ corresponding to the claw tooth of the protruding claw B, and a corresponding central angle $\beta 1$ between adjacent claw teeth of the protruding claw B is greater than a central angle $\alpha 2$ corresponding to the claw tooth of the protruding claw A. That is, each claw tooth of the protruding claw A is located between two claw teeth of the protruding claw B, each claw tooth of the protruding claw B is located between two adjacent claw teeth of the protruding claw A, and there is a gap between the claw teeth of the protruding claw A and the claw teeth of the protruding claw B, such that the protruding claws can rotate without being stuck.

In another implementation in this embodiment, the top surface and the inclined planes of each claw tooth of the protruding claw A and the protruding claw B and the bottom surface between adjacent claw teeth each have a drum-shaped size of 0.02-0.1 mm, which may be selected but is not limited to 0.02 mm, 0.03 mm, 0.05 mm, 0.08 mm, and 0.1 mm. In this embodiment, the set drum-shaped size is 0.05 mm. Through the design of the drum-shaped size, the surfaces of the claw teeth of the protruding claw A and the protruding claw B can be well attached to achieve a better transmission effect.

In addition, in this embodiment, the stop hub includes shaft sleeve 52, an end of the shaft sleeve is provided with flange 54, and an end face of the flange is provided with the protruding claw B. The transmission shaft is sleeved with the shaft sleeve of the stop hub, spline 53 is arranged on an outer peripheral wall of the shaft sleeve, the inner ring 62 of the overload clutch is sleeved on the outer peripheral wall of the stop hub and is splined with the outer peripheral wall. The inner ring of the front end housing 64 of the overload clutch is splined with the transmission shaft, and the front end face of the front end housing is axially limited. A disc spring member 7 is arranged between the rear end housing 65 of the overload clutch and the end face of the flange of the stop hub, and the disc spring member is composed of a plurality of disc springs. The disc springs generate axial force on the rear end housing and compresses the friction plates 61a and 61b of the overload clutch, and the outer ring 63 of the overload clutch covers the disc spring. The number of disc springs can be 2, 4, 10 or more, which is determined according to the power of the engine used. A limit distance L is formed between the end face of the stop hub and the inner end face of the front end housing of the overload clutch. The length of the limit distance L is less than the maximum axial moving length of the protruding claw structure, which can avoid the stop hub being separated from the driven gear, resulting in idling and losing the purpose of overload protection.

A shaft shoulder is arranged on the transmission shaft, an isolating ring 9 is arranged at the shaft shoulder, and the isolating ring axially limits the front end face of the front end housing of the overload clutch; and the isolating ring is in cambered surface contact with the shaft shoulder.

As another embodiment of this embodiment, a ball bearing 8 for supporting the transmission case 10 is arranged between the isolating ring and the front end face of the front end housing of the overload clutch.

Figure 5:
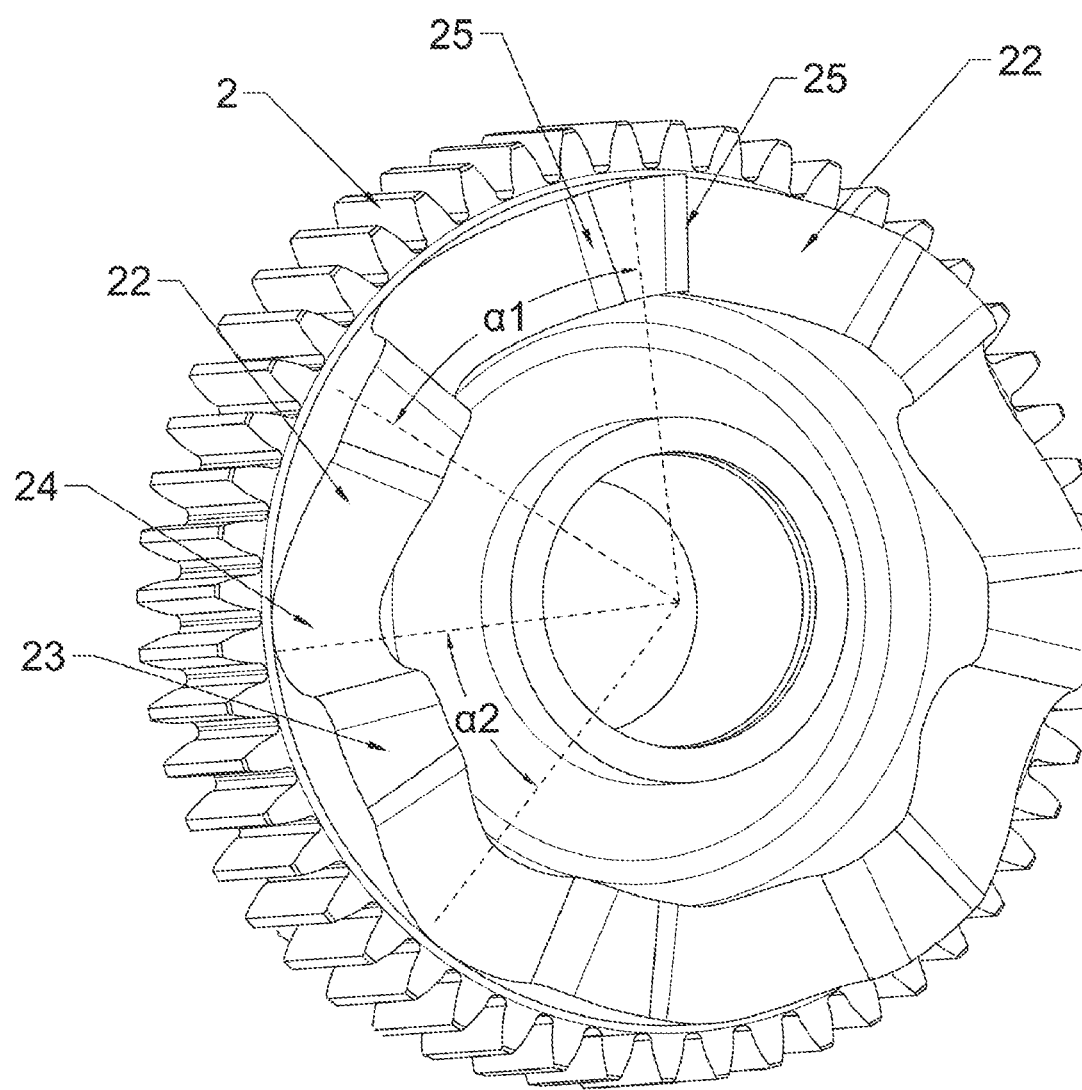
FIG. 5 is an axonometric view of a driven gear.
Figure 6:
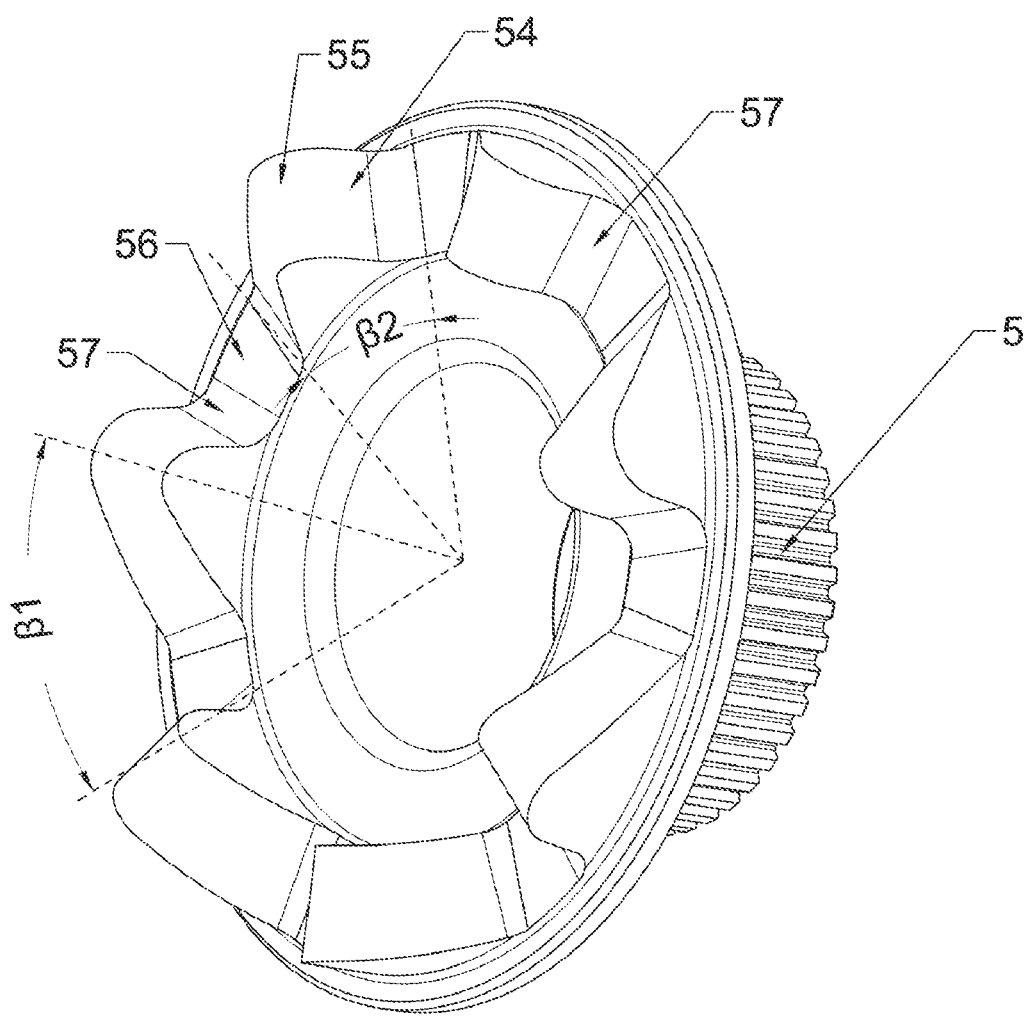
FIG. 6 is an axonometric view of a stop hub.

In the transmission system for an aircraft powerplant according to this embodiment, the engine drives the driving gear to rotate, the driving gear drives the driven gear to rotate, the driven gear transmits a rotation torque to the stop hub 5 by a protruding claw mechanism, the stop hub is connected to an internal spline of the overload clutch by a spline. A slip force value of the friction plates 61a and 61b is adjusted (a friction coefficient is fixed) by the magnitude of a pressing force of the disc spring 7, the overload clutch 6 is connected to the transmission shaft 1 by a spline, and when resistance of the transmission shaft 1 is greater than slip torque of the overload clutch 6, the clutch 6 slides to disconnect the stop hub of an output shaft to temporarily interrupt the power, so as to achieve the purpose of protecting the transmission shaft and other weak parts. In transmitting the torque input of the driving teeth, since the protruding claw 21 of the driven gear of FIG. 5 is in bevel contact with the stop hub of FIG. 6, and when a torque component exceeds the friction force of the protruding claw at an original position, the stop hub of FIG. 6 is moved backward by the axial force, and the disc spring is pressed after an axial movement, resulting in a reaction force opposite to a moving direction to maintain the position of the stop hub of FIG. 6. The other side of the disc spring 7 is subjected to the same force, which acts on the friction plates 61a and 61b of the clutch 6, and the friction coefficient of the friction plates 61a and 61b is fixed. When the pressure increases, that is, when the friction force increases, a slip torque increases and improves the safety performance.

Therefore, the power system of the present invention can be matched with engines of different powers and a variety of powertrain, achieves the purpose of overload protection in different powertrain states, and has good economy.

Secondly, the protruding claw mechanism cooperates with the disc spring to achieve the objective of vibration reduction, and the vibration reduction is achieved by the rotation speed unevenness and torque unevenness caused by the transmission of the driving gear through the cooperation of the protruding claw and a reaction force of the disc spring. When the torque increases, the protruding claw mechanism moves backward to compress a disc spring group, and the disc spring group stores potential energy, and releases the potential energy when the torque decreases, so as to adjust the torque fluctuation. When the rotation speed fluctuates, the same effect and principle are achieved.

Thirdly, the transmission system of the present invention has a light weight, small size, and facilitate arrangement, so that it has great advantages for mechanical arrangements sensitive to size and weight.

Fourthly, through the design of the isolating ring, not only can the disc spring seat be limited, but also a functionality of impact protection can be achieved.

What is claimed is:

1. A transmission system for an aircraft powerplant, comprising a transmission shaft, wherein an input end of the transmission shaft is sleeved with a driven gear, one end of the driven gear is axially limited, and the other end of the transmission shaft is configured to connect a rotating member;
the other end of the driven gear is in transmission connection with a stop hub, the stop hub is in transmission connection with an overload clutch, the overload clutch is in transmission connection with the transmission shaft, a disc spring member is interposed between one end of the overload clutch and the stop hub, the other end of the overload clutch is axially limited, and a limit distance is formed between the overload clutch and the stop hub;
a force value of the overload clutch varies with a pressure applied; and
an end face of the driven gear facing the stop hub is provided with a protruding claw A, an end of the stop hub is provided with a protruding claw B matching the protruding claw A, and the stop hub and the driven gear are in transmission through a matching between the protruding claws,
wherein the protruding claw A and the protruding claw B are provided with a same number of claw teeth, the claw teeth of the protruding claw A and the claw teeth of the protruding claw B match each other, and the protruding claw A and the protruding claw B each have 3-10 claw teeth, and
the claw teeth of the protruding claw A and the claw teeth of the protruding claw B each have inclined planes and a top surface, a bottom surface is provided between adjacent protruding claws, the inclined plane is a spiral section, a fillet is provided between the inclined plane and the top surface, and a fillet is provided between the inclined plane and the bottom surface.

2. The transmission system for the aircraft powerplant according to claim 1, wherein the spiral section has a helix angle of 25°-65°.

3. The transmission system for the aircraft powerplant according to claim 2, wherein each claw tooth of the protruding claw A has a height different from that of the claw tooth of the protruding claw B.

4. The transmission system for the aircraft powerplant according to claim 3, wherein a height difference between the claw teeth of the protruding claw A and the claw teeth of the protruding claw B is 0.1-3 mm.

5. The transmission system for the aircraft powerplant according to claim 4, wherein a corresponding central angle between adjacent claw teeth of the protruding claw A is greater than a central angle corresponding to the claw tooth of the protruding claw B, and a corresponding central angle between adjacent claw teeth of the protruding claw B is greater than a central angle corresponding to the claw tooth of the protruding claw A.

6. The transmission system for the aircraft powerplant according to claim 5, wherein a shaft sleeve is arranged on the transmission shaft at an end of the driven gear, the shaft sleeve axially limits the driven gear, and a needle bearing is arranged between an end face of the driven gear and an end face of the shaft sleeve.

7. The transmission system for the aircraft powerplant according to claim 4, wherein a shaft sleeve is arranged on the transmission shaft at an end of the driven gear, the shaft sleeve axially limits the driven gear, and a needle bearing is arranged between an end face of the driven gear and an end face of the shaft sleeve.

8. The transmission system for the aircraft powerplant according to claim 3, wherein a shaft sleeve is arranged on the transmission shaft at an end of the driven gear, the shaft sleeve axially limits the driven gear, and a needle bearing is arranged between an end face of the driven gear and an end face of the shaft sleeve.

9. The transmission system for the aircraft powerplant according to claim 2, wherein a shaft sleeve is arranged on the transmission shaft at an end of the driven gear, the shaft sleeve axially limits the driven gear, and a needle bearing is arranged between an end face of the driven gear and an end face of the shaft sleeve.

10. The transmission system for the aircraft powerplant according to claim 1, wherein a shaft sleeve is arranged on the transmission shaft at an end of the driven gear, the shaft sleeve axially limits the driven gear, and a needle bearing is arranged between an end face of the driven gear and an end face of the shaft sleeve.

11. The transmission system for the aircraft powerplant according to claim 10, wherein the end of the stop hub is provided with a flange, the protruding claw B is arranged on an end face of the flange, a spline is arranged on an outer peripheral wall of the stop hub, an inner ring of the overload clutch is sleeved on and is in spline fit with the outer peripheral wall of the stop hub, an inner ring of a front end housing of the overload clutch is splined with the transmission shaft, and a front end face of the front end housing is axially limited;

a disc spring is arranged between a rear end housing of the overload clutch and the end face of the flange of the stop hub; and an outer ring of the overload clutch covers an outer ring of the disc spring.

12. The transmission system for the aircraft powerplant according to claim 11, wherein a shaft shoulder is arranged on the transmission shaft, an isolating ring is arranged at the shaft shoulder, and the isolating ring axially limits the front end face of the front end housing of the overload clutch; and the isolating ring is in cambered surface contact with the shaft shoulder.

13. The transmission system for the aircraft powerplant according to claim 1, wherein the end of the stop hub is provided with a flange, the protruding claw B is arranged on an end face of the flange, a spline is arranged on an outer peripheral wall of the stop hub, an inner ring of the overload clutch is sleeved on and is in spline fit with the outer peripheral wall of the stop hub, an inner ring of a front end housing of the overload clutch is splined with the transmission shaft, and a front end face of the front end housing is axially limited;

a disc spring is arranged between a rear end housing of the overload clutch and the end face of the flange of the stop hub; and an outer ring of the overload clutch covers the disc spring.

14. The transmission system for the aircraft powerplant according to claim 13, wherein a shaft shoulder is arranged on the transmission shaft, an isolating ring is arranged at the shaft shoulder, and the isolating ring axially limits the front end face of the front end housing of the overload clutch; and the isolating ring is in cambered surface contact with the shaft shoulder.

15. The transmission system for the aircraft powerplant according to claim 14, wherein a bearing for supporting a case is arranged between the isolating ring and the front end face of the front end housing of the overload clutch.

16. The transmission system for the aircraft powerplant according to claim 1, wherein a shaft sleeve is arranged on the transmission shaft at an end of the driven gear, the shaft sleeve axially limits the driven gear, and a needle bearing is arranged between an end face of the driven gear and an end face of the shaft sleeve.

17. The transmission system for the aircraft powerplant according to claim 1, wherein a shaft sleeve is arranged on the transmission shaft at an end of the driven gear, the shaft sleeve axially limits the driven gear, and a needle bearing is arranged between an end face of the driven gear and an end face of the shaft sleeve.

* * * * *